United States Patent
Roesner

(10) Patent No.: US 10,574,170 B2
(45) Date of Patent: Feb. 25, 2020

(54) METHOD FOR SWITCHING OFF A POLYPHASE ELECTRICAL MACHINE IN A MOTOR VEHICLE

(71) Applicant: SEG Automotive Germany GmbH, Stuttgart (DE)

(72) Inventor: Julian Roesner, Untergruppenbach (DE)

(73) Assignee: SEG AUTOMOTIVE GERMANY GMBH, Stuttgart (DE)

( * ) Notice: Subject to any disclaimer, the term of this patent is extended or adjusted under 35 U.S.C. 154(b) by 0 days.

(21) Appl. No.: 16/097,361

(22) PCT Filed: Nov. 30, 2016

(86) PCT No.: PCT/EP2016/079184
§ 371 (c)(1),
(2) Date: Oct. 29, 2018

(87) PCT Pub. No.: WO2017/186319
PCT Pub. Date: Nov. 2, 2017

(65) Prior Publication Data
US 2019/0149079 A1  May 16, 2019

(30) Foreign Application Priority Data

Apr. 29, 2016 (DE) .......... 10 2016 207 386
Sep. 1, 2016 (DE) .......... 10 2016 216 560

(51) Int. Cl.
*H02P 21/00* (2016.01)
*H02P 27/12* (2006.01)
(Continued)

(52) U.S. Cl.
CPC .......... *H02P 27/12* (2013.01); *H02P 3/18* (2013.01); *H02P 21/22* (2016.02); *H02P 21/30* (2016.02);
(Continued)

(58) Field of Classification Search
CPC ................ H02P 27/12; H02P 21/22
(Continued)

(56) References Cited

U.S. PATENT DOCUMENTS

2010/0231151 A1  9/2010  Ohtani et al.

FOREIGN PATENT DOCUMENTS

DE  10 2013 215306 A1  2/2015
JP  S60 5786 A  1/1985

OTHER PUBLICATIONS

International Patent Application No. PCT/EP2016/079184, International Search Report (ISR) and Written Opinion dated Mar. 30, 2017—10 pages (relevance found in references cited and English ISR).

*Primary Examiner* — Erick D Glass
(74) *Attorney, Agent, or Firm* — Lathrop GPM LLP

(57) ABSTRACT

The invention relates to a method for switching off a multi-phase electric machine (110) in a motor vehicle, the multi-phase electric machine (110) comprising a rotor having a rotor winding (101) and a stator having a multi-phase stator winding (110a), wherein in a block mode (210) of the electric machine (110) a parameter influencing a synchronous generated voltage vector ($U_p$) of a synchronous generated voltage is adjusted such that the synchronous generated voltage reaches a first threshold value ($S_1$), wherein the block mode (210) is deactivated when the first threshold value ($S_1$) is reached and a PWM mode (220) for applying a phase voltage with a phase voltage vector ($U_s$) is activated, wherein the phase voltage vector ($U_s$) and the synchronous generated voltage vector ($U_p$) are varied in PWM mode (220) until the parameter influencing the synchronous generated voltage reaches a further threshold value ($S_2$), wherein the phase voltage is switched off when the further threshold value ($S_2$) is reached. Furthermore, the invention (Continued)

Figure 1:
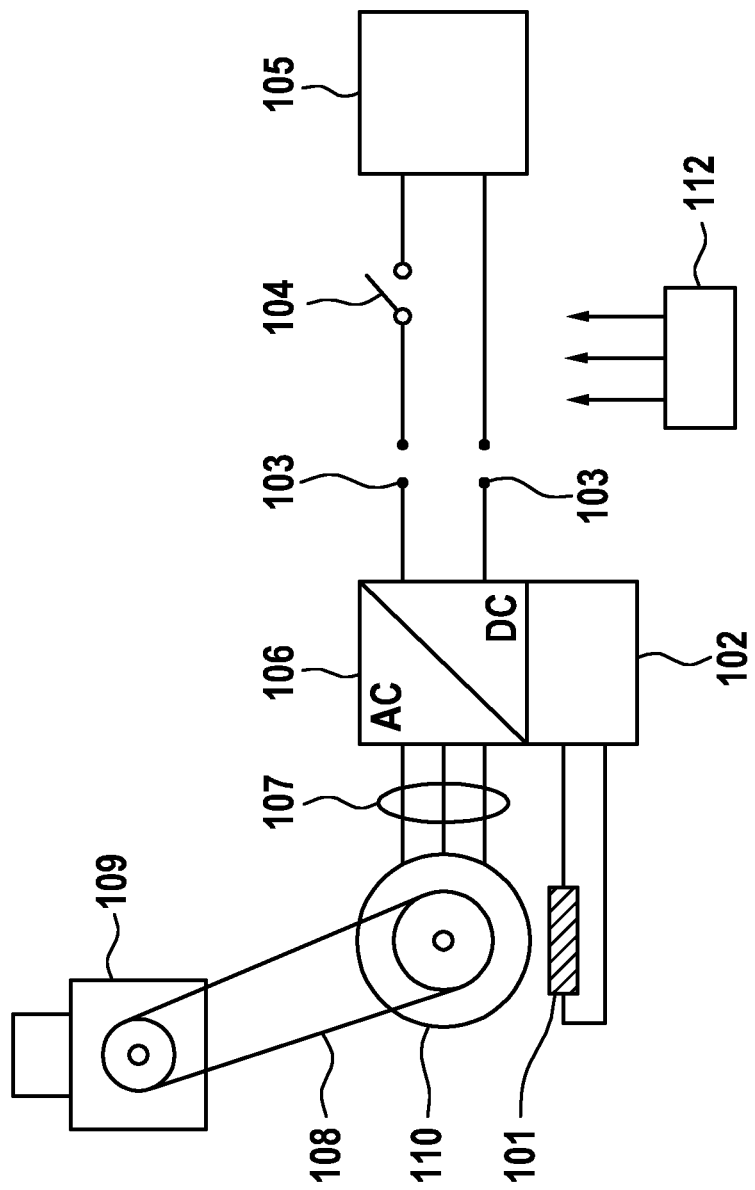

relates to a computing unit (112) configured to carry out the method.

14 Claims, 7 Drawing Sheets

(51) Int. Cl.
| | |
|---|---|
| *H02P 25/22* | (2006.01) |
| *H02P 25/024* | (2016.01) |
| *H02P 27/08* | (2006.01) |
| *H02P 23/20* | (2016.01) |
| *H02P 27/06* | (2006.01) |
| *H02P 23/00* | (2016.01) |
| *H02P 3/18* | (2006.01) |
| *H02P 21/22* | (2016.01) |
| *H02P 21/30* | (2016.01) |

(52) U.S. Cl.
CPC .......... *H02P 23/0027* (2013.01); *H02P 23/20* (2016.02); *H02P 25/024* (2016.02); *H02P 25/22* (2013.01); *H02P 27/06* (2013.01); *H02P 27/08* (2013.01)

(58) Field of Classification Search
USPC .............................................. 318/400.02, 139
See application file for complete search history.

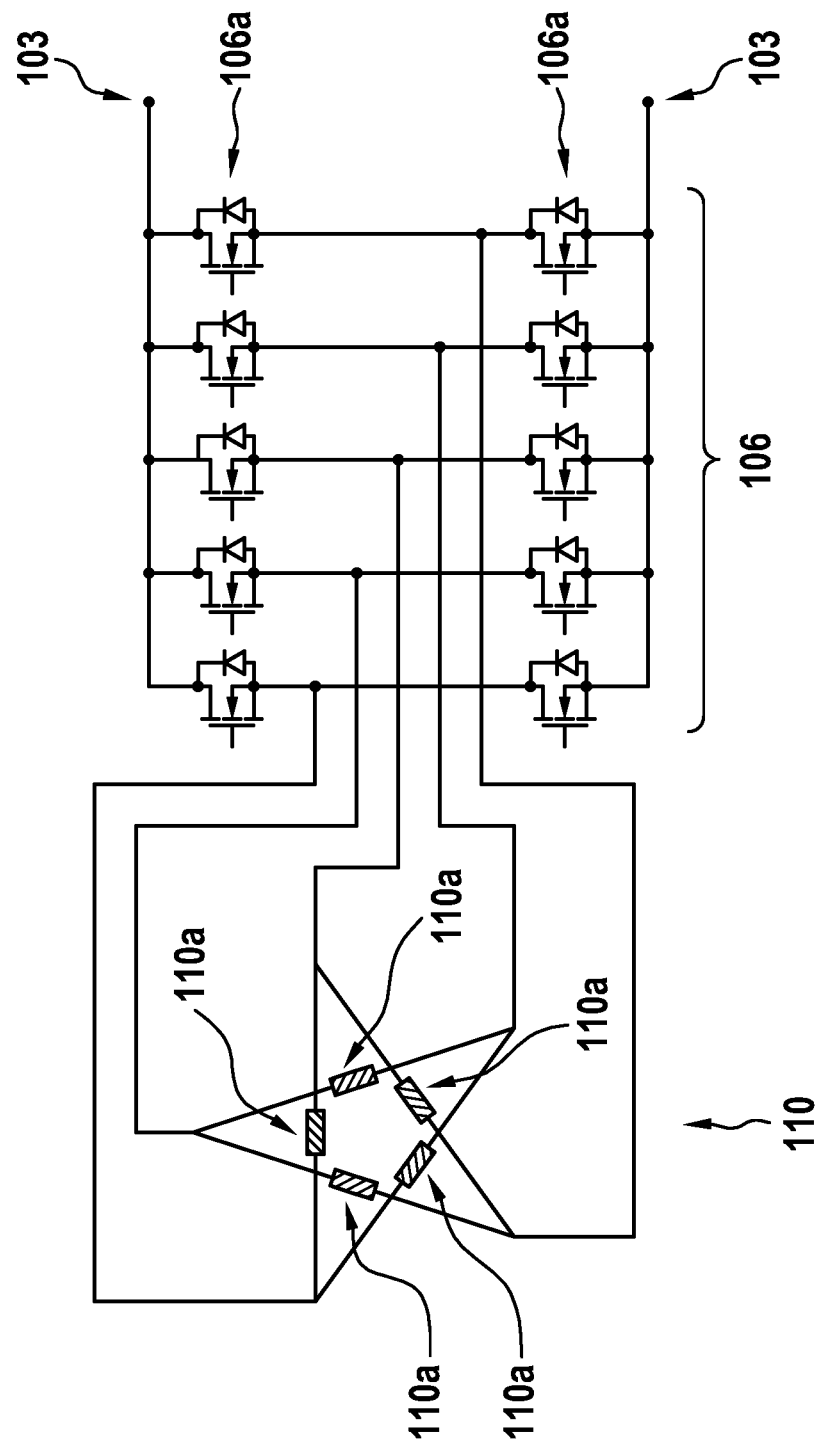

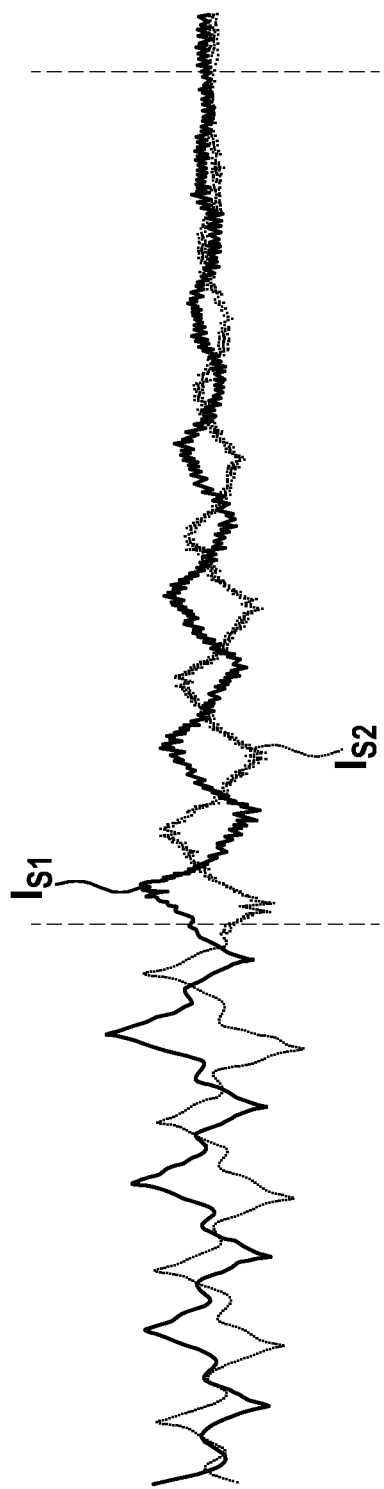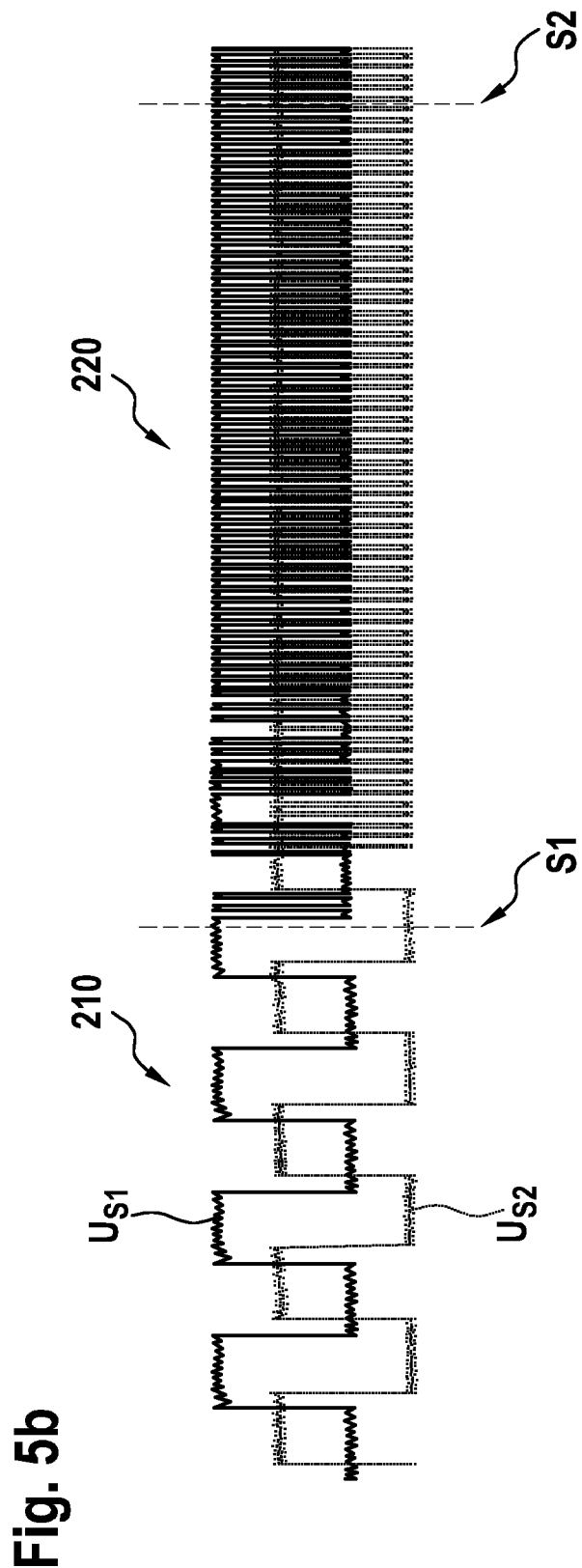

METHOD FOR SWITCHING OFF A POLYPHASE ELECTRICAL MACHINE IN A MOTOR VEHICLE

CROSS-REFERENCE TO RELATED APPLICATIONS

This application is a 35 U.S.C. § 371 filing of International Application No. PCT/EP2016/079184 filed Nov. 30, 2016, which claims the benefit of priority to German Patent Application No. 10 2016 207 386.9 filed Apr. 29, 2016 and German Patent Application No. 10 2016 216 560.7 filed Sep. 1, 2016, each of which is incorporated herein by reference in its entirety.

FIELD

The present invention relates to a method for switching off a multi-phase electric machine in a motor vehicle as well as a computing unit and a computer program for carrying out the method.

STATE OF THE ART

Electric machines in motor vehicles that can be operated as generators or motors are known. Such electric machines usually have a rotor with an excitation winding (rotor winding) which can be energized with an excitation current, and a stator with a multi-phase stator winding to which a multi-phase phase voltage with a phase voltage vector can be applied.

Use of the electric machine in a motor vehicle may require frequent switching on and off of the electric machine. Switching off the electric machine can be problematic, especially at high speeds. If the phase voltage is switched off first, a current flow through the inverse diodes of the MOSFETs occurs due to the excitation current still flowing and thus to an undesired generator operation for this operating state. If an excitation voltage or current is first switched off, the synchronous generated voltage falls below a voltage limit within a decay time of the excitation voltage or current, which results in a high current flow in the electric machine. Due to the resulting power loss, the electronic components of the electric machine in particular are subjected to unnecessary thermal stress.

DE 10 2013 215 306 A1 shows a procedure for switching off an electric machine at high speeds, wherein the excitation current is first switched off and the excitation current decays according to the time constant of the excitation winding, wherein the phase voltage is then switched off when it corresponds to the absolute value of the synchronous generated voltage.

According to the invention, a method for switching off a multi-phase electric machine in a motor vehicle is proposed as well as a computing unit and a computer program for carrying out the method, having the features of the independent patent claims. Advantageous embodiments are the subject of the dependent claims and of the following description.

The electric machine has a rotor with rotor winding and a stator with a multi-phase stator winding. In particular, a power converter is connected downstream of the stator winding. The electric machine is connected via the power converter in particular to a vehicle electrical system, in particular to a DC electrical system.

Advantages of the Invention

In the operation of the electric machine, especially at higher speeds, typically n>3000 rpm, the electric machine is operated in a so-called block mode or block commutation. Here, the individual stator windings are acted upon with voltage blocks, wherein the temporal control width of the voltage blocks preferably corresponds to half a total revolution (180°) of the rotor and wherein the individual voltage blocks of the respective phases of the stator winding are preferably temporally offset from one another. This operating mode is particularly advantageous at high speeds of the electric machine, since no significant switching losses occur, for example in comparison to an operating mode in which the electric machine would be operated in pulse width modulation mode (PWM) with a clock frequency adapted to the speed of the electric machine and thus correspondingly high. To switch off the electric machine, it is necessary that both the excitation current and the phase voltage of the electric machine are switched off or reduced as quickly as possible to a value corresponding to approximately zero (0V or 0 A).

However, the excitation current and phase voltage should be switched off in such a way as to avoid the disadvantages described above.

For this purpose, the excitation current is first reduced to such an extent that the synchronous generated voltage determined i.a. by the excitation current corresponds to a first threshold value. This threshold value corresponds in magnitude and phase or direction preferably to the phase voltage. If the excitation current were further reduced, the synchronous generated voltage would be lower than the phase voltage, resulting in a phase current that would result in an adverse thermal effect. However, since the phase voltage in block mode is determined by the DC voltage of the vehicle battery applied to the power converter, the phase voltage in block mode can only be varied in its phase position with respect to the synchronous generated voltage, but not in its magnitude.

In order to further reduce the synchronous generated voltage or the excitation current and the phase voltage, according to the invention it is switched from block mode of the electric machine to PWM mode when the first threshold value is reached. This operating mode is characterized by the fact that the control pulses have a different pulse width for each constant pulse frequency. This enables the phase voltage to be reduced simultaneously with the synchronous generated voltage or excitation current, thus preventing current flow in the stator winding and thus thermal loading of the electric machine. In addition, the first threshold value is selected in such a way that no undesired current peaks occur when switching between block mode and PWM mode. This is particularly the case if the synchronous generated voltage and the phase voltage are identical in magnitude and direction and are always reduced equally. This avoids high electrical and mechanical loads when changing the operating modes of the electric machine (block mode to PWM mode).

In the course of the process, an optimum time for switching off the phase voltage of the electric machine is also determined. PWM mode allows the phase voltage in magnitude and/or phase (direction) to be adapted to the synchronous generated voltage in such a way that phase currents of essentially 0 A result. An optimum time for switching off the phase voltage is determined by determining at least one parameter which influences the synchronous generated voltage, preferably the excitation current or the excitation voltage and/or the rotational speed of the electric machine, and by comparing the parameter with a further threshold value. The parameters influencing the synchronous generated voltage can be adjusted as required, wherein the speed of the electric machine is preferably a free parameter which can assume almost any value, and the excitation current or excitation voltage can be controlled to a value which essentially corresponds to 0 A or 0V in magnitude.

In principle, it is understood that an adaptation, in particular a reduction, of the excitation current or excitation voltage can be controlled by the field controller during the entire switch-off process. Furthermore, it is also possible that the excitation current is switched off and the respective steps of the switch-off procedure are effected during a decay of the excitation current within the decay time. When the excitation current is switched off by the field controller, it can disconnect the rotor winding from the excitation voltage applied. A reduction of the voltage or current to a value of approximately 0V or 0 A can also be covered by switching off.

This makes it possible to switch off the electric machine independently of a speed of the electric machine and/or of an internal combustion engine of the motor vehicle. In particular, it makes it possible to gently switch off the electric machine at high speeds.

The process is suitable for both generator and motor operation of the electric machine and for all types of motor and commercial vehicles, especially hybrid vehicles.

In particular, it makes it possible to operate the electric machine as a motor and to support the internal combustion engine. Even at high speeds, the electric machine can be switched off easily and without great loads. For example, it is not necessary to wait until the speed falls below a permissible limit value in order to switch off the electric machine. The electric machine can be switched off at the best possible time.

Even in case that the electric machine receives a torque request during the switch-off process according to the invention, one can switch back directly into motor or generator operation by switching the excitation current or the phase voltage on again, since phase voltage and synchronous generated voltage are controlled during the switch-off process in such a way that the phase current preferably corresponds essentially to 0 A. This prevents the occurrence of voltage or current peaks and enables the electric machine to be switched off or on with as little mechanical stress as possible.

A computer unit according to the invention, e.g. a control unit of a motor vehicle, is set up, particularly in terms of programming, to carry out a method according to the invention.

Also the implementation of the method in the form of a computer program is advantageous, since this causes particularly low costs, in particular if an executing control unit is still used for further tasks and therefore exists anyway.

Further advantages and embodiments of the invention result from the description and the enclosed drawing.

The invention is shown schematically in the drawing on the basis of embodiments and is described in the following with reference to the drawing.

SHORT DESCRIPTION OF THE DRAWINGS

Figure 3A:
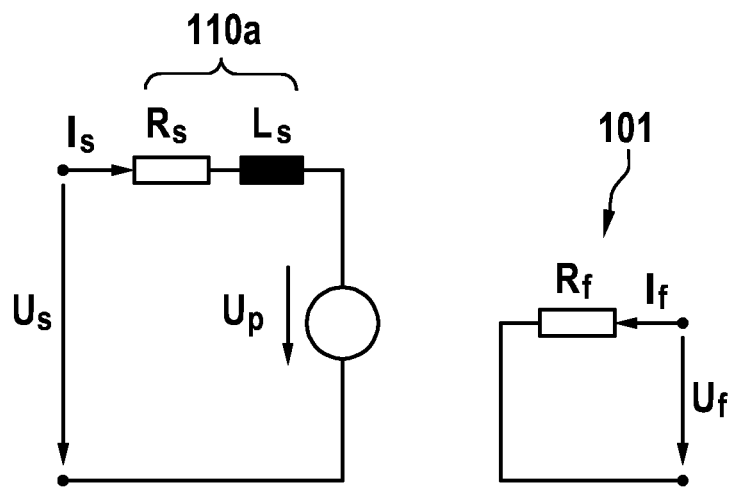
Figure 3B:
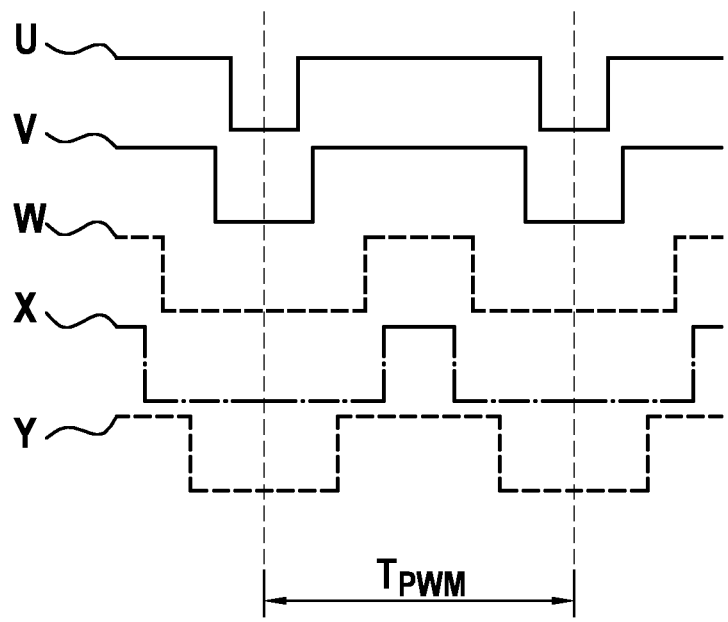
Figure 3C:
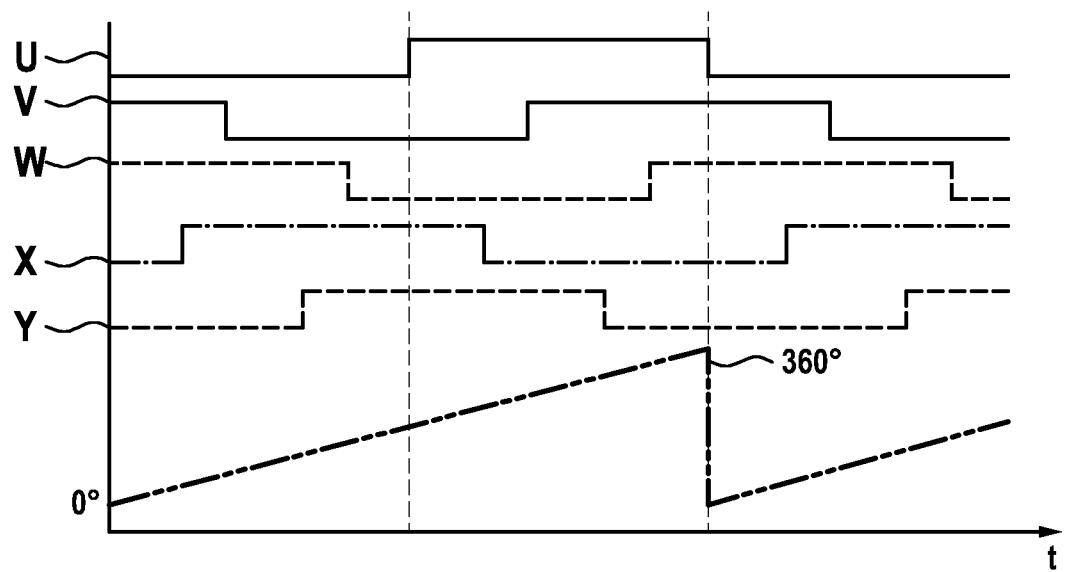
Figure 4:
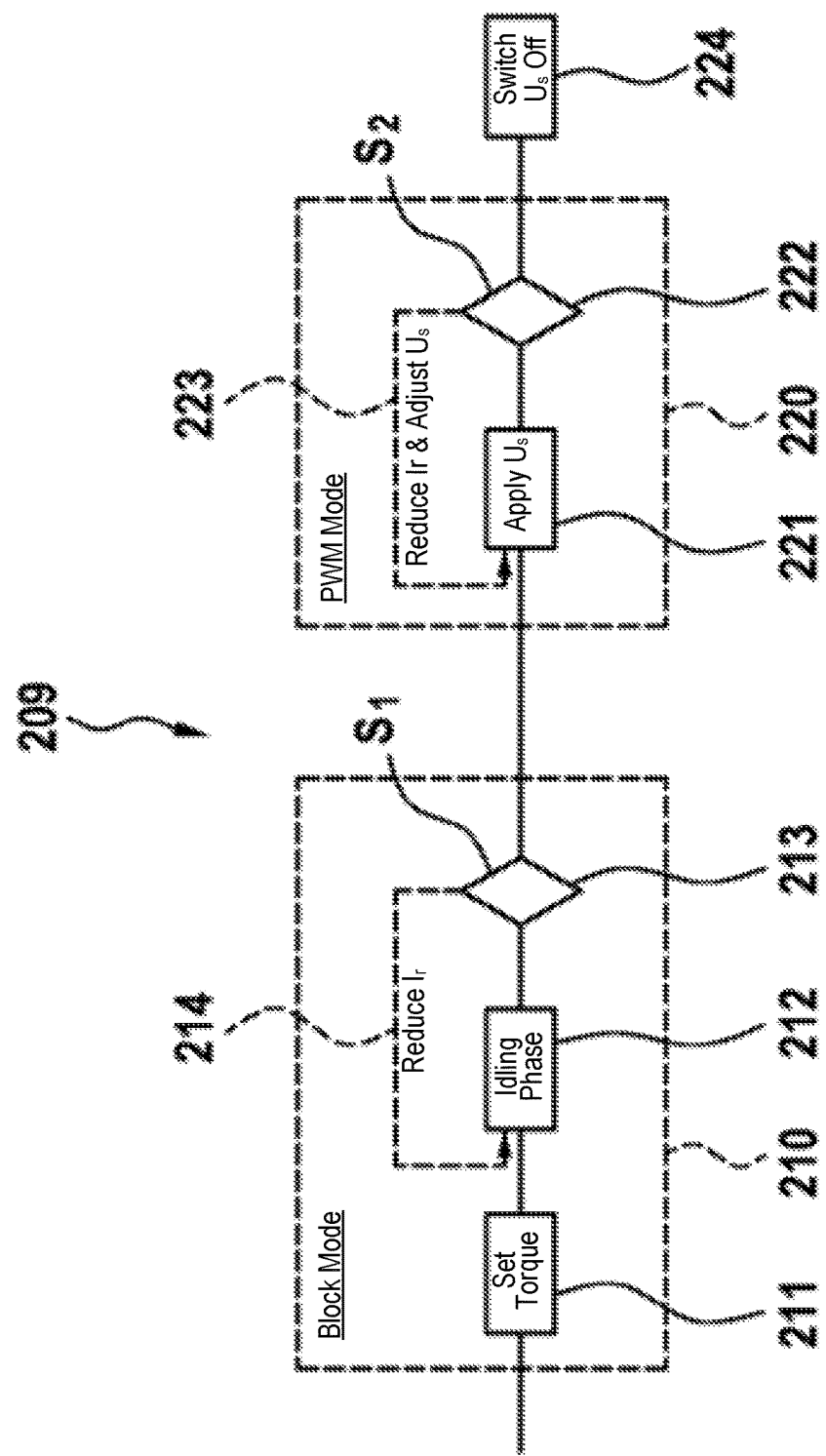
Figure 6A:
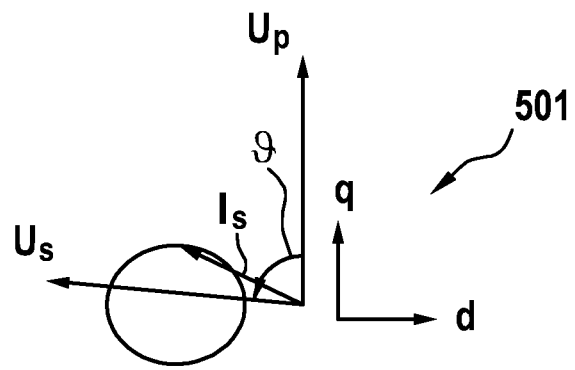
Figure 6B:
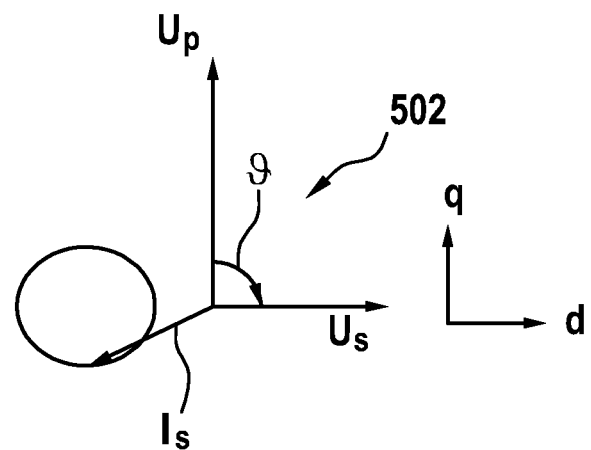
Figure 6C:
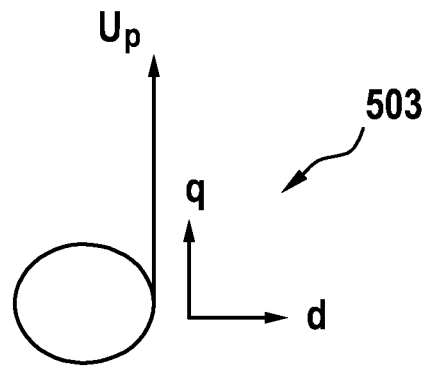

FIG. 1 schematically shows an arrangement of an internal combustion engine and an electric machine of a motor vehicle, which are configured to carry out an embodiment of the invention;

FIG. 2 shows a circuit diagram of a five-phase electric machine of a motor vehicle which is configured to carry out an embodiment of the invention;

FIG. 3a schematically shows a single-phase equivalent circuit diagram of the five-phase electric machine from FIG. 2;

FIG. 3b schematically shows a PWM control of a 5-phase electric machine;

FIG. 3c schematically shows a block control of a 5-phase electric machine;

FIG. 4 schematically shows a preferred embodiment of an inventive method for switching off an electric machine as a block diagram;

FIG. 5a, b schematically show a phase voltage and phase current curve in the preferred embodiment of the inventive method for switching off an electric machine according to FIG. 4; and FIG. 6a-c schematically show pointer diagrams that can be determined in the course of an embodiment of the invention.

EMBODIMENT(S) OF THE INVENTION

FIG. 1 schematically shows components of a motor vehicle. The motor vehicle has an electric machine 110, wherein in the following a synchronous generator excited externally is assumed without loss of generality. For example, the electric motor 110 can be operated as a generator via an internal combustion engine 109 of the motor vehicle. The electric machine 110 is connected in a torque-locked way to the internal combustion engine 109 by corresponding coupling means, e.g. by a mechanical connection 108 in the form of a belt drive or a shaft. Alternatively, the electric machine 110 can also be operated as motor and can support the internal combustion engine 109.

The electric machine 110 is electrically connected to a power converter 106, with several phase connections 107 provided. The power converter 106 can be operated as a rectifier and as an inverter. The several phase connections 107 are phase connections of a multi-phase stator winding of an electric machine stator 110. On the DC side, a rotor winding 101 of the electric machine 110 is connected via a field controller 102. The field controller 102 is responsible for controlling the rotor winding 101. An energy accumulator, for example a vehicle battery 105, can be connected to the DC side of the power converter 106 via DC voltage connections 103. The vehicle battery 105 can be electrically connected to and disconnected from the DC side of the power converter 106 via a switching element 104.

A computing unit embodied as a control unit 112 is configured, in particular in terms of program technology, to carry out an embodiment of the method according to the invention. In particular, the control unit 112 controls the field controller 102 and the power converter 106 according to the invention.

FIG. 2 shows the electric machine 110 in the form of a circuit diagram. The electric machine 110 is shown in this special example as a five-phase electric machine. The electric machine 110 has a stator with a five-phase stator winding 110a. The power converter 106 has several electrical switching elements, which in this example are embodied as MOSFETs 106a (metal oxide semiconductor field effect transistor). MOSFETs correspond to a transistor and an inverse diode switched in the reverse direction. For example, the MOSFETs 106a are connected to the stator windings 110a via busbars on the one hand and to the DC voltage connections 103 on the other hand.

If the electric machine 110 is operated in generator mode, a five-phase alternating voltage, the so-called phase voltage, is generated in the stator winding 110a. This five-phase alternating voltage is directed into a DC voltage by means of appropriate clocked control of the MOSFETs 106a. This converted DC voltage can be used, for example, to charge the vehicle battery 105.

If the electric machine 110 is operated in motor mode, the DC voltage of the vehicle battery 105 is converted into the five-phase phase voltage with a rotating phase voltage vector by means of appropriate clocked control of the MOSFETs 106a. The MOSFETs 106a are controlled by the control unit 112 in a clocked manner.

It should be noted that this invention is not intended to be limited to a five-phase electric machine, but is suitable for electric machines with an appropriate number of phase connections 107.

Preferred embodiments of the method for switching off the electric machine 110 are described below with reference to FIGS. 3, 4 and 5. Furthermore, this description is based on the special example of a motor operation of the electric machine 110. In particular, the preferred embodiments of the methods according to the invention are carried out by the control unit 112. The control unit controls in particular the field controller 102, the power converter 106 and optionally also the switching element 104 accordingly.

FIG. 3a schematically shows a single-phase equivalent circuit diagram of an externally excited synchronous machine in general and in particular of the five-phase electric machine 110 according to FIG. 2. The rotor winding 101 corresponds in the equivalent circuit diagram to a resistor $R_f$. The stator winding 110a corresponds in the equivalent circuit diagram to a series connection of a resistor $R_S$ and an inductance $L_S$.

FIG. 3b shows an example of a typical PWM control 220 of an electric machine 110 on the basis of a 5-phase (U, V, W, X, Y) stator winding 110a. Here, the control pulses have a different pulse width for each constant pulse frequency or time interval $T_{PWM}$ of the respective pulses to each other.

FIG. 3c shows a typical block control 210 of an electric machine 110 on the basis of a 5-phase (U, V, W, X, Y) stator winding 110a. In addition, in the same time period, the angle of the rotor is displayed from 0° to 360°. As can be seen, the control blocks of the respective phases (U, V, W, X, Y) have a control width of 180° in relation to the rotor rotation.

FIG. 4 shows a preferred embodiment of an inventive method for switching off the electric machine 110 as a block diagram.

In motor operation, the electric machine 110 is supplied with an excitation voltage $U_f$ and the phase voltage Us and converts this electrical energy into mechanical energy in order to support the internal combustion engine 109 with this mechanical energy. The magnitude or amplitude of this phase voltage Us is determined in particular by the DC voltage of the vehicle battery 105 applied to the power converter 106 as the supply voltage. The excitation voltage $U_f$ is applied to the rotor winding 101 by means of the field controller 102, wherein an excitation current $I_f$ is generated in the rotor winding 101. The excitation current $I_f$ is in particular controlled to a desired setpoint value by means of a PI controller. The excitation current $I_f$ induces the synchronous generated voltage $U_p$ in the stator winding 110a when the rotor of the electric machine is rotating. The synchronous generated voltage $U_p$ is dependent on the speed w and the magnitude of the excitation current $I_f$. The exact determination of the synchronous generated voltage $U_p$ is given below.

The electric machine 110 is initially switched on and is in block mode 210, wherein the electric machine 110 can support the internal combustion engine 109. Here, a torque of the electric machine 110 or the internal combustion engine 109 can be set in step 211. The torque can be adjusted by varying a pole wheel angle, which in turn is adjusted by the direction of the phase voltage vector $U_S$, which in turn is adjusted by corresponding control of the power converter 106. Via an appropriate control loop, the pole wheel angle ϑ is varied in such a way that a desired torque is set (cf. in particular FIG. 5a). If no torque is required from the electric motor 110 or no torque is transmitted to the internal combustion engine 109, the electric motor 110 is in an idling phase 212.

In the idling phase 212, the electric machine 110 rotates at least at the specified speed of the internal combustion engine 109 due to the torque-locking connection with the internal combustion engine 109, provided that the electric machine 110 is not decoupled from the internal combustion engine 109, for example by a freewheel. In order to minimize the losses of the electric machine 110, it is advantageous to switch off the electric machine 110, so that the loss torque of the electric machine 110 is only reduced to the comparatively low mechanical friction torque of the electric machine 110.

The electric machine 110 is switched off in the course of the preferred embodiment of the method according to the invention.

During the idling phase 212, the electric machine 110 is initially operated in block mode 210, in which a block-shaped switching voltage is applied to the stator winding 110a. To switch off the electric machine 110 during the idle phase 212, both the excitation current $I_f$ and the quantities derived therefrom, such as the synchronous generated voltage $U_p$ and the phase voltage Us, must be reduced to a value that is as small as possible in terms of magnitude, in particular to zero. In order to avoid the disadvantages mentioned at the beginning, which can be associated with switching off the excitation current $I_f$ and/or the phase voltage Us, the switching off process is effected according to the invention according to the following steps. It goes without saying that the electric machine 210 can also be switched off outside an idling phase 212.

In step 213 at least one parameter influencing the synchronous generated voltage $U_p$ is first determined. Preferably a magnitude and a direction of the synchronous generated voltage vector are determined as the parameters influencing the synchronous generated voltage $U_p$. Alternatively or additionally, the magnitude of the excitation current $I_f$ and/or the speed ω of the electric machine 110 can preferably be determined as the at least one parameter influencing the synchronous generated voltage $U_p$. The speed ω of the electric machine 110 and the magnitude of the excitation current $I_f$ are usually known anyway or are determined in the vehicle anyway. Therefore, no additional effort is required to determine the magnitude of excitation current $I_f$ and/or the speed ω of the electric machine 110.

In this particular example, the magnitude of the synchronous generated voltage vector is determined as a parameter influencing the synchronous generated voltage $U_p$. In particular, the magnitude is determined as a function of the excitation current magnitude $I_f$ and the speed ω. In particular, this determination shall be made according to the following formula:

$$U_p = \Psi_R \frac{2\pi}{60} \omega,$$

$\Psi_R$ is a flux linkage generated by the excitation current $I_f$. Due to saturation effects, the relationship between excitation current $I_f$ and flux linkage $\Psi_R$ is not linear. In particular, this relationship between excitation current $I_f$ and flux linkage $\Psi_R$ is stored as a characteristic curve or in the form of a compensating polynomial, especially in the control unit 112. The direction of the synchronous generated voltage vector results from the construction and current position of the rotor.

A parameter influencing the synchronous generated voltage, in particular the excitation current $I_f$, is reduced in a further step 214 and it is checked whether the magnitude and/or direction of the synchronous generated voltage vector $U_p$ each reach a first threshold value $S_1$. The respective threshold value $S_1$ is selected in such a way that the threshold value S, corresponds to the phase voltage $U_S$ in magnitude and/or direction at a respective time. If the excitation current $I_f$ were reduced to such an extent that the synchronous generated voltage $U_p$ would be smaller than the phase voltage $U_S$, this would result in a current flow $I_s$ in the phase winding 107, which in turn would result in a power loss of the electric machine 110. To avoid this, the magnitude and/or phase of the phase voltage $U_S$ would also have to be adjusted accordingly, so that the current $I_s$ in the phase winding is always zero net during the switch-off process 209. However, this is not possible in block mode 210, since only the phase can be adjusted here, but not the magnitude of the phase voltage $U_S$. When the threshold $S_1$ is reached, block mode 210 is deactivated and PWM mode 220 is activated. In addition, the currents $I_s$ caused in the stator phases within block mode 210 are associated with superimposed harmonics, which is why rapid switch-off or switch-on is problematic, even in case that $U_p=U_S$ in average, as a synchronous generated voltage $U_p$ can be induced to a not inconsiderable extent as a result.

Switching from block mode 210 to PWM mode 220 is therefore advantageous, as undesirable current peaks and high electrical and mechanical loads on the electric machine 110 can be avoided—by particularly selecting the appropriate threshold value $S_1$.

In step 221, in a PWM mode, a phase voltage $U_S$ with a phase voltage vector is applied to the stator winding 110*a* by pulse width modulation (PWM) of the supply voltage. This phase voltage vector corresponds in magnitude and direction to a currently prevailing synchronous generated voltage vector of a synchronous generated voltage $U_p$. The magnitude of the synchronous generated voltage vector can be adjusted while maintaining the speed ω of the electric motor 110 or the internal combustion engine 109, in particular via the excitation current $I_f$— as a parameter influencing the synchronous generated voltage. This has the advantage that it is possible to switch off the electric machine 110 without any problems even at high speeds. The excitation current $I_f$ is further reduced, indicated by reference sign 223, until the magnitude of the synchronous generated voltage vector disappears. Here the excitation current $I_f$ reaches a further threshold value $S_2$. Meanwhile, the phase voltage $U_S$ is also adjusted accordingly, so that the phase voltage vector $U_S$ continues to correspond to the synchronous generated voltage vector $U_p$ in magnitude and direction (also indicated by reference symbol 223).

The magnitude and phase of the phase voltage vector $U_S$ and of the synchronous generated voltage vector $U_p$ are each determined in step 222 and compared with each other. If there is a deviation from the magnitude and/or phase of the phase voltage vector $U_S$ and the synchronous generated voltage vector $U_p$, these can be readjusted, in particular by means of controller 112. If the parameter influencing the synchronous generated voltage reaches the further threshold value $S_2$, the phase voltage $U_S$ is switched off in a further step 224. Switching off the phase voltage $U_S$ after the parameter influencing the synchronous generated voltage has reached the threshold value $S_2$ (this corresponds in particular to the excitation current $I_f=0$ A) is unproblematic, as the electric machine 110 can no longer be operated as a generator due to the excitation current $I_f$ being no longer present.

The phase voltage $U_S$ can either be switched off by disconnecting the phase connections 107 by the power converter 106 or the phase voltage $U_S$ can also be reduced to a value of approx. 0V.

A disconnection of the phase connections 107 by the power converter 106 is therefore not fundamentally necessary, since the excitation current $I_f$ and the phase voltage $U_S$ can also be reduced, especially simultaneously, to a value of 0 A or 0V in order to adapt the phase voltage $U_S$ to the synchronous generated voltage $U_p$, and this in fact also corresponds to a switch-off.

It goes without saying that an adaptation, in particular a reduction, of the excitation current $I_f$ or the excitation voltage can be controlled by the field controller 102 during the entire switch-off process. It is also possible that the excitation current $I_f$ is switched off and the respective steps of the switch-off method 209 are effected during a decay of the excitation current $I_f$ within the decay time. When the field controller 102 switches off the excitation current $I_f$, it disconnects the rotor winding 101 from the applied excitation voltage $U_f$.

FIG. 5 compares the course of a phase current $I_{S1}$ of a first phase and the course of a phase current $I_{S2}$ of a further phase (cf. FIG. 5*a*) with the course of the phase voltages $U_{S1}$ and $U_{S2}$ of the respective phases (cf. FIG. 5*b*) overtime. Here it can be seen how the phase voltages $U_{S1}$ and $U_{S2}$ change from block mode 210 to PWM mode 220 after reaching a first threshold $S_1$. It can also be seen that the phase currents $I_{S1}$ and $I_{S2}$ are superimposed with a harmonic during block mode 210 and also shortly after the changeover from block mode 210 to PWM mode 220, which are problematic in the case of a fast switch-off or switch-on, as a synchronous generated voltage $U_p$ can be induced to a not inconsiderable extent. The total voltage ripples within phase currents $I_{S1}$ and $I_{S2}$ are therefore reduced to a threshold value $S_2$ (value close to zero) within PWM mode 220, wherein in this state the electric machine 110 can be switched off without inducing a significant synchronous generated voltage $U_p$.

A relationship between the phase voltage $U_S$, the synchronous generated voltage $U_p$, the phase current Is and the excitation current $I_f$ and thus the theoretical background of the inventive methods are explained in more detail in FIG. 6.

In FIG. 6, pointer diagrams and dq diagrams 501, 502 and 503, respectively, of an externally excited synchronous machine, in particular of the five-phase electric machine 110 as shown in FIG. 2, are shown in an example in a rotationally fixed dq coordinate system, as they can be determined in the course of an embodiment of the invention.

The synchronous generated voltage $U_p$ is by definition on the q-axis and is shown as a first pointer. The q-axis forms the so-called excitation axis. The d-axis is electrically orthogonal to the q-axis. The phase voltage $U_S$ is shown as a second pointer and is shifted by one pole wheel angle ϑ with respect to the synchronous generated voltage $U_p$. The pole wheel angle ϑ is also known as the load angle. In generator operation (see FIG. 6*b*) of the electric machine 110, the pole wheel angle $\vartheta$ has positive values, a pole wheel or the exciter "rushes ahead". In motor operation of the electric machine 110, as shown in FIG. 6a, the pole wheel angle $\vartheta$ has negative values, the pole wheel or exciter "rushes after".

In block mode, the magnitude of the phase voltage $U_S$ is determined by the DC voltage of the vehicle battery 105 applied to the power converter 106. The phase voltage $U_S$ can therefore in block mode only be varied in its phase position with respect to the pole wheel voltage $U_p$, i.e. via its pole wheel angle $\vartheta$ with respect to the synchronous generated voltage $U_p$. The phase position or the pole wheel angle $\vartheta$ can be adjusted appropriately by means of the power converter 106.

The phase current $I_S$ is represented as a third vector in the dq coordinate system. The result is a phase current vector whose locus curve corresponds to the circle shown when the polar wheel angle changes from 0°-360°.

FIG. 6a shows a first dq diagram 501 for an electric machine 110 in motor operation, where the synchronous generated voltage vector $U_p$ as the at least one parameter influencing the synchronous generated voltage does not reach the first threshold value $S_1$. Here it can be seen that the phase current $I_S$ becomes zero for no pole wheel angle $\vartheta$. Switching off the power converter 106 would therefore result in a generator current flow via the inverse diodes of the MOSFETs 106a.

FIG. 6b shows another dq diagram 502 for an electric machine 110 in generator operation, where the synchronous generated voltage vector $U_p$ as the at least one parameter influencing the synchronous generated voltage does not reach the first threshold value $S_1$. Here it can be seen that the phase current $I_S$ becomes zero for no pole wheel angle. Switching off the power converter 106 would therefore result in a lossy current flow via the inverse diodes of the MOSFETs 106a.

FIG. 6c shows another dq diagram 503, where the synchronous generated voltage vector $U_p$ as at least one parameter influencing the synchronous generated voltage reaches the first threshold value $S_1$. This state can be reached both from the motor operation of the electric machine 110 (see FIG. 6a) and from the generator operation of the electric machine 110 (see FIG. 6b). The pole wheel angle $\vartheta$ is 0° so that the phase position of the phase voltage $U_S$ corresponds to the phase position of the synchronous generated voltage $U_p$. Since phase voltage $U_S$ and synchronous generated voltage $U_p$ are equal in magnitude and direction, theoretically no phase current $I_S$ is generated. However, the currents $I_s$ caused in the stator phases within block mode 210 are associated with superimposed harmonics, which is why rapid switch-off or switch-on is problematic even in case that the time average $U_p=U_S$, as a pole wheel synchronous generated voltage $U_p$ can be induced to a not inconsiderable extent. Switching from block mode to PWM mode for further reduction of the excitation current $I_f$ and the phase voltage $U_S$ is therefore advantageous in order to enable particularly smooth switching off of the electric machine 110.

The invention claimed is:

1. A method for switching off a multi-phase electric machine (110) in a motor vehicle, the multi-phase electric machine (110) including a rotor having a rotor winding (101) and a stator having a multi-phase stator winding (110a), the method comprising:

a block mode (210) of the electric machine (110), adjusting a parameter influencing a synchronous generated voltage such that a synchronous generated voltage vector (Up) of the synchronous generated voltage reaches a first threshold value (S1), in response to the synchronous generated voltage vector (Up) reaching the first threshold value (S1), deactivating the block mode (210) and activating a PWM mode (220) for applying a phase voltage with a phase voltage vector (Us), varying the phase voltage vector (Us) and the parameter influencing the synchronous generated voltage in the PWM mode (220) until the parameter influencing the synchronous generated voltage reaches a further threshold value (S2), and in response to the parameter influencing the synchronous generated voltage reaching the further threshold value (S2), switching the phase voltage.

2. A method according to claim 1, wherein a magnitude and/or a direction of the synchronous generated voltage vector (Up) is used as the parameter influencing the synchronous generated voltage.

3. Method according to claim 1, wherein the first threshold value corresponds to a magnitude and/or a direction of the phase voltage vector (Us) of the phase voltage present in block mode (210).

4. Method according to claim 2, wherein the first threshold value corresponds to a magnitude and/or a direction of the phase voltage vector (Us) of the phase voltage present in block mode (210).

5. Method according to claim 1, wherein the magnitude of the excitation current (If) and/or the speed (ω) of the electric machine (110) are used (210) as the parameter influencing the synchronous generated voltage.

6. Method according to claim 1, wherein the phase voltage vector (Us) and the synchronous generated voltage vector (Up) are varied in PWM mode (220) in such a way that a phase current (IS) flowing in the stator winding (110a) always approximately corresponds to zero in magnitude.

7. Method according to claim 1, wherein the magnitude of the further threshold value (S2) of the parameter influencing the synchronous generated voltage approximately corresponds to zero.

8. Method according to claim 1, wherein the electric machine (110) is operated as motor and/or as generator.

9. A computing unit (112) configured to carry out a method according to claim 1.

10. A computer program which causes a computing unit (112) to carry out a method according to claim 1 when executed on the computing unit (112).

11. Machine-readable storage medium having stored thereon a computer program according to claim 10.

12. Method according to claim 2, wherein the magnitude of the synchronous generated voltage vector (Up) is reduced.

13. Method according to claim 6, wherein the phase voltage vector (Us) and the synchronous generated voltage vector (Up) are reduced in magnitude, in such a way that the phase current (IS) flowing in the stator winding (110a) always approximately corresponds to zero in magnitude.

14. Method according to claim 7, wherein the magnitude of the excitation current (If) in PWM mode approximately corresponds to zero.

* * * * *